United States Patent
Ogasawara et al.

[11] Patent Number: 5,831,842
[45] Date of Patent: Nov. 3, 1998

[54] ACTIVE COMMON MODE CANCELER

[75] Inventors: Satoshi Ogasawara; Hirofumi Akagi, both of Okayama; Hideki Ayano, Okayama-ken, all of Japan

[73] Assignee: President of Okayama University, Okayama, Japan

[21] Appl. No.: 906,257

[22] Filed: Aug. 5, 1997

[30] Foreign Application Priority Data

Sep. 18, 1996 [JP] Japan .................. 8-246092

[51] Int. Cl.$^6$ .............. H02M 1/12; H02M 5/45; H02J 3/00
[52] U.S. Cl. .............. 363/40; 363/37; 363/41; 363/34
[58] Field of Search .............. 363/40, 41, 39, 363/37, 34, 132; 323/222

[56] References Cited

U.S. PATENT DOCUMENTS

| | | | |
|---|---|---|---|
| 4,679,130 | 7/1987 | Moscovici | 363/17 |
| 4,876,637 | 10/1989 | Mose et al. | 363/37 |
| 4,937,720 | 6/1990 | Kirchberg | 363/41 |
| 5,373,223 | 12/1994 | Akagi et al. | 363/34 |
| 5,483,140 | 1/1996 | Hess et al. | 363/34 |
| 5,568,371 | 10/1996 | Pitel et al. | 363/39 |
| 5,661,390 | 8/1997 | Lipo et al. | 363/37 |

*Primary Examiner*—Peter S. Wong
*Assistant Examiner*—Rajnikant B. Patel
*Attorney, Agent, or Firm*—Oblon, Spivak, McClelland, Maier & Neustadt, P.C.

[57] ABSTRACT

An active common mode canceler includes a voltage detection circuit including a plurality of capacitors connected to the output terminals of a power converter for performing power conversion by switching a power semiconductor device and serving to detect a common mode voltage generated when the power semiconductor device is switched, a push-pull type emitter follower circuit which is controlled by the common mode voltage detected by the voltage detection voltage to output a voltage equal in magnitude and opposite in polarity to the common mode voltage, and a common mode transformer having multiple windings and serving to cancel out the common mode voltage by superimposing the voltage output from the emitter follower circuit on the output from the power converter.

18 Claims, 4 Drawing Sheets

COMMON MODE CANCELER

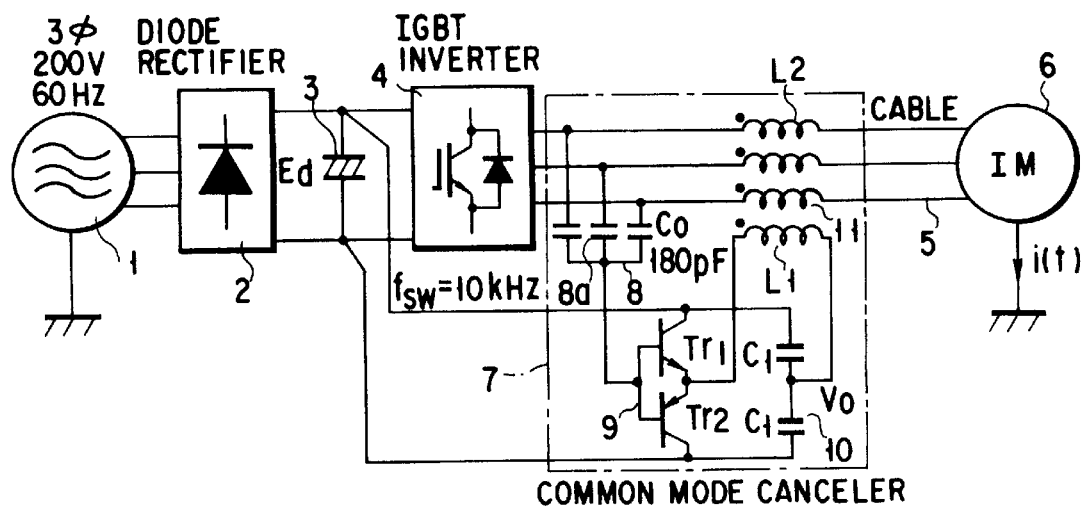
F I G. 1
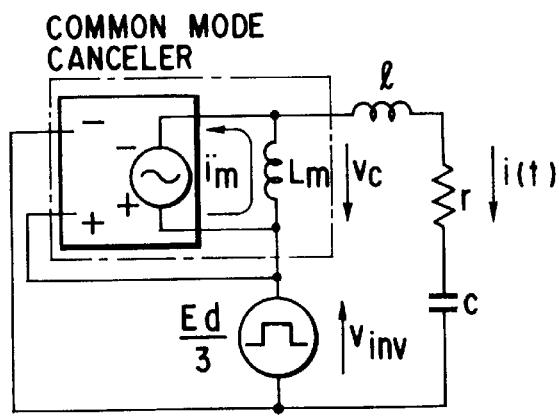
F I G. 2

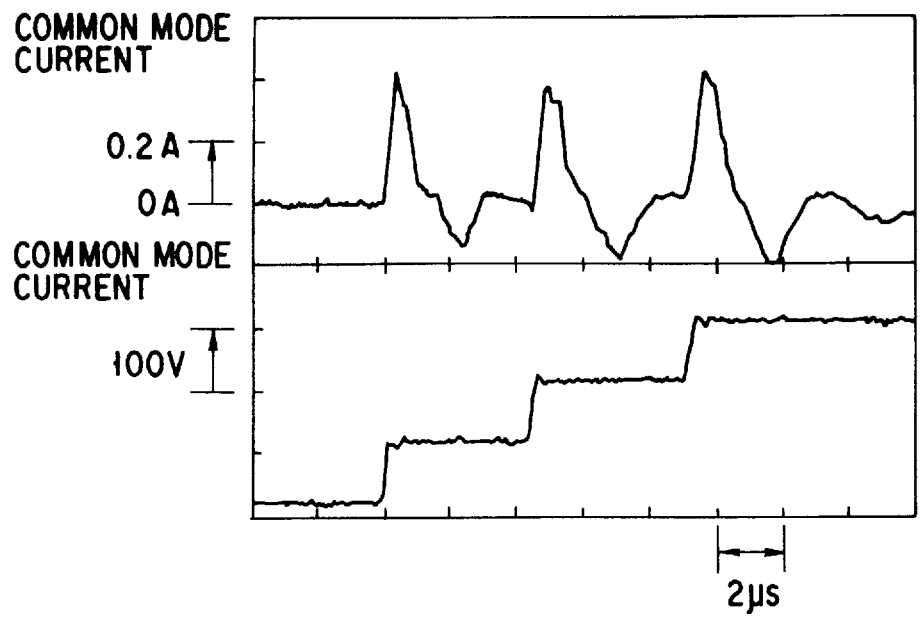
F I G. 3
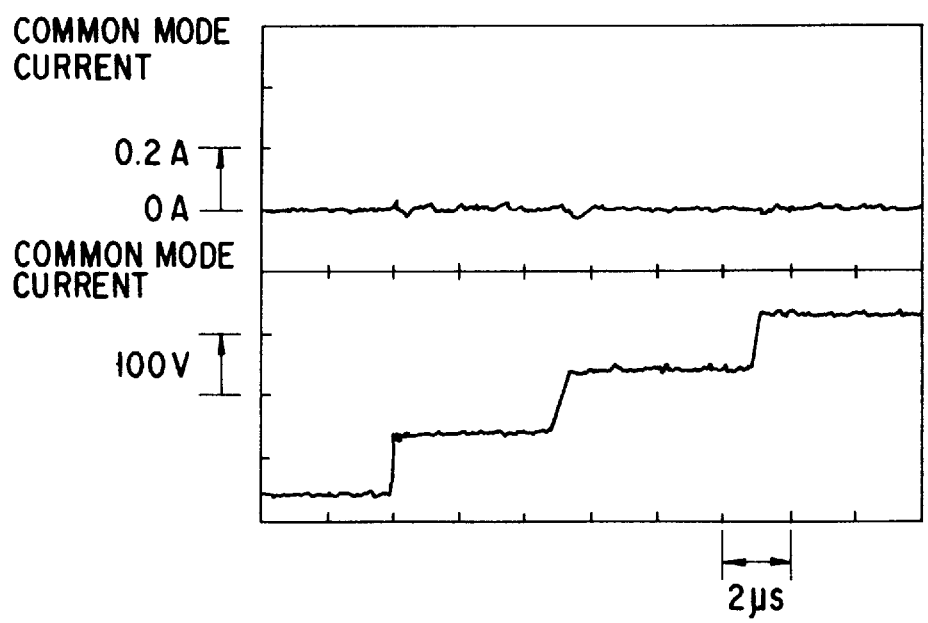
F I G. 4

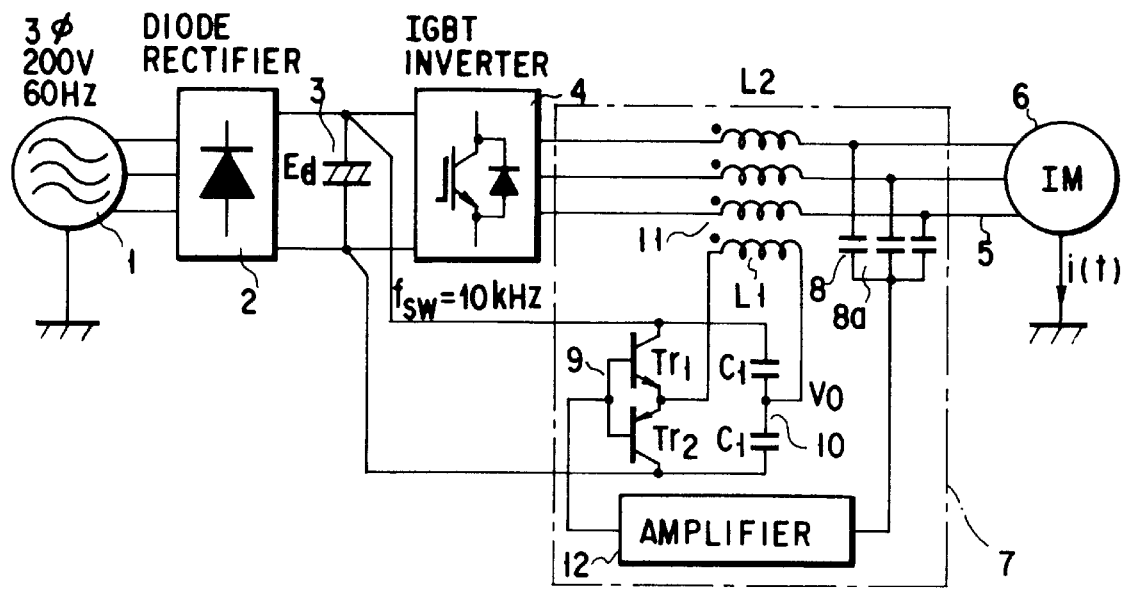
F I G. 5
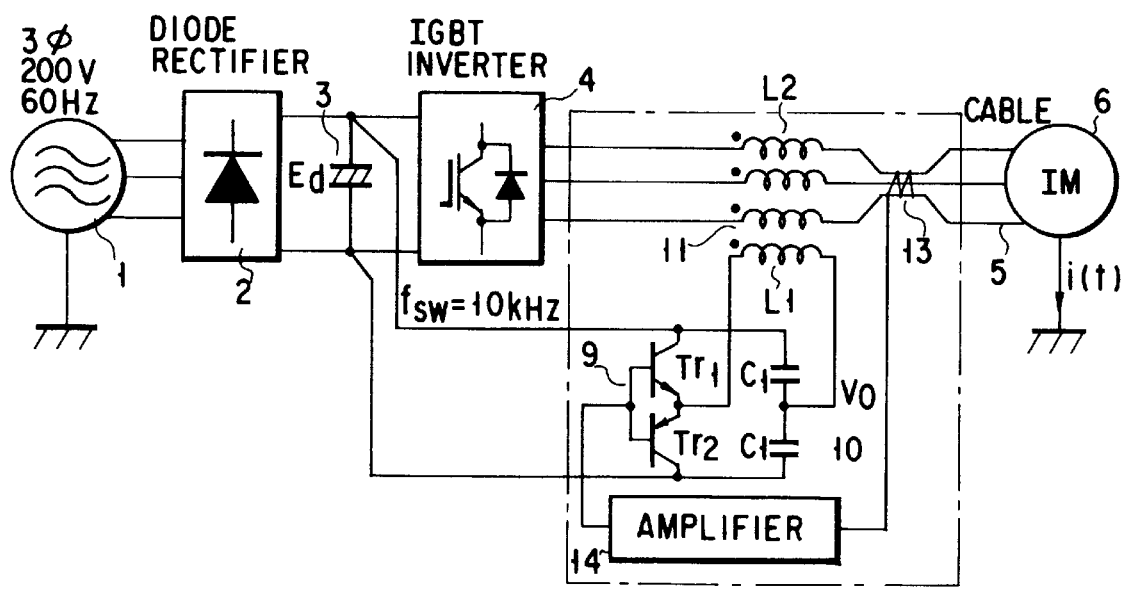
F I G. 6

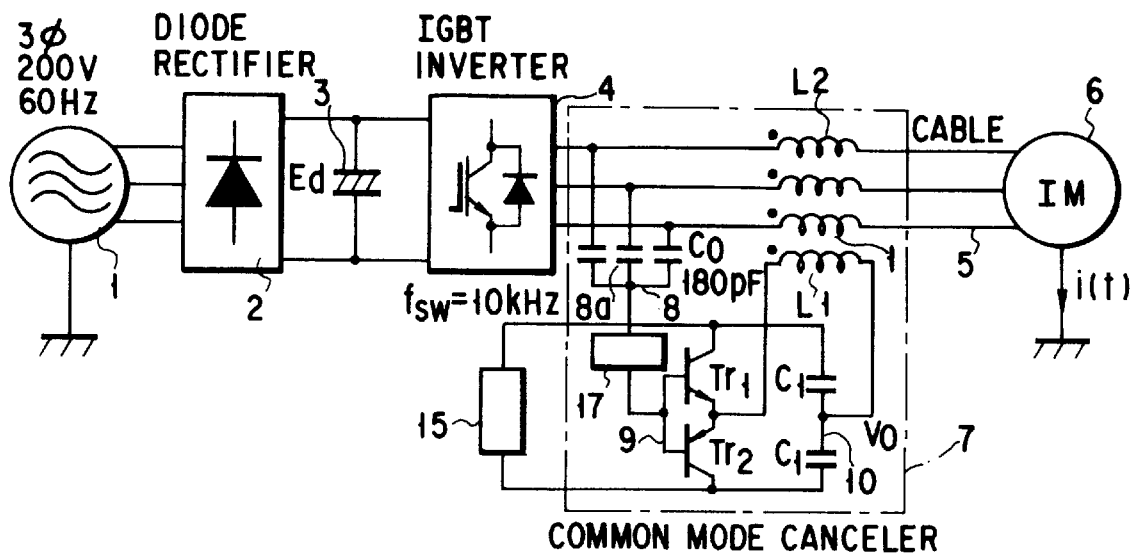
F I G. 7
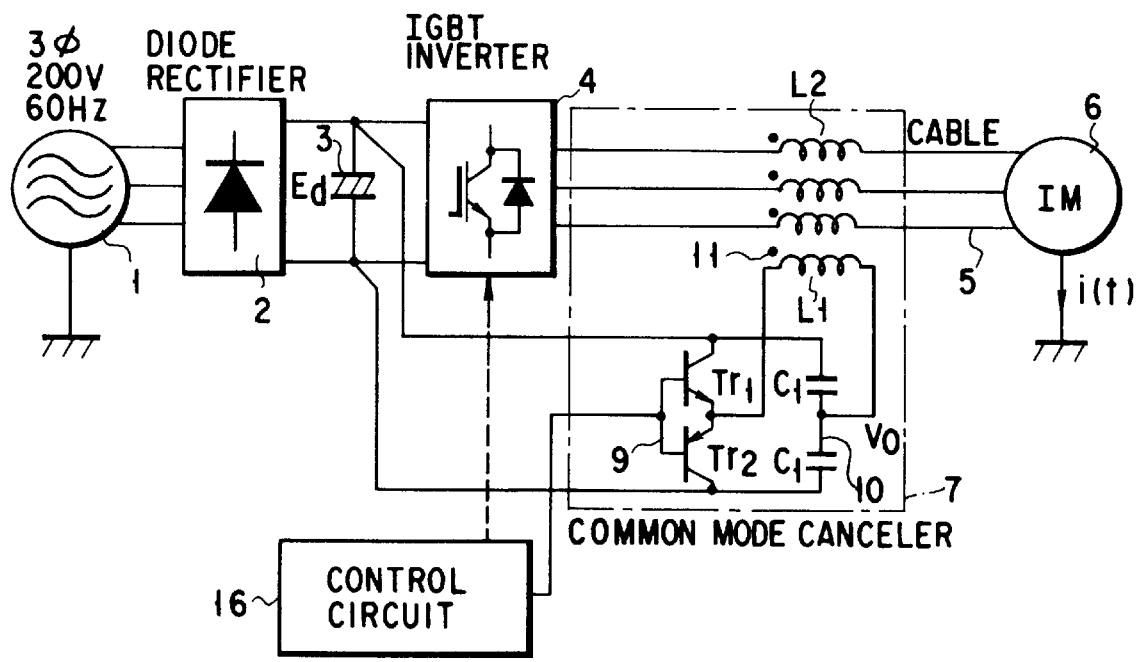
F I G. 8

ACTIVE COMMON MODE CANCELER

BACKGROUND OF THE INVENTION

The present invention relates to an active common mode canceler for canceling out a common mode voltage (zero phase-sequence voltage) generated when power conversion is performed by switching a power semiconductor device represented by a power converter, e.g., an inverter.

In recent years, the range of applications of power converters such as voltage-source PWM inverters for controlling the operations of motors as loads has widened, and the characteristics of power semiconductor device have improved. With this trend, there have been increasing tendencies to increase the carrier frequencies of the voltage-source PWM inverters.

With such an increase in the frequency of a voltage-source PWM inverter, the following problems have become serious:

(1) a high-frequency leakage current flowing in the ground line through the stray capacitance of the load;

(2) electromagnetic interference (EMI) associated with conductivity and radioactive characteristics;

(3) deterioration of motor winding insulation; and (4) disturbances caused by a motor shaft voltage, a bearing current, and the like. "Deterioration of motor winding insulation" is a phenomenon which occurs when the sharply increasing components of the stepwise voltage generated in the inverter concentrate at the input terminal of the motor winding. The term "motor shaft voltage" means the voltage generated between the frame and shaft of the motor. This voltage is applied on the thin oil film between each ball and the inner and outer races of the bearing. If the oil film is torn, a so-called "bearing current" flows. The bearing current causes a undesirable chemical reaction at the contact between the bearing and the motor shaft, inevitably shortening the lifetime of the bearing.

These disturbances are caused by an abrupt change in voltage or a current generated at the time of switching of the voltage-source PWM inverter.

As to EMI, in particular, it is expected that some council for standards having international binding force, such as CISPR (International Special Committee on Radio Interference) or IEC (International Electrotechnical Commission), will discuss EMI standards for power electronics devices such as inverters.

Conventionally, to suppress these disturbances, a common mode choke or an EMI filter is provided for the input circuit or output circuit of a voltage-source inverter. However, these elements are constituted by combinations of only passive elements, such as reactors and capacitors. Even if, therefore, abrupt changes in current and voltage may be suppressed by such an arrangement, the causes of disturbances themselves cannot be completely eliminated.

BRIEF SUMMARY OF THE INVENTION

It is an object of the present invention to provide an active common mode canceler which can completely eliminate disturbances caused by stepwise changes in common mode voltage generated at the time of switching of the power semiconductor device of a power converter.

In order to achieve the above object, an active common mode canceler is constituted by the following means.

According to the first aspect of the present invention, there is provided an active common mode canceler comprising voltage detection means for detecting a common mode voltage generated when a power semiconductor device of a power converter for performing power conversion by switching the power semiconductor device is switched, a control voltage source which is controlled by the common mode voltage detected by the voltage detection means to generate a voltage equal in magnitude and opposite in polarity to the common mode voltage, and voltage superimposition means for canceling out the common mode voltage by superimposing the voltage generated by the control voltage source on an output from the power converter.

According to the second aspect of the present invention, there is provided an active common mode canceler comprising a control voltage source for outputting a common mode voltage to cancel out a common mode voltage generated when a power semiconductor device of a power converter for performing power conversion by switching the power semiconductor device is switched, voltage superimposition means for superimposing the common mode voltage output from the control voltage source on the common mode voltage generated by the power converter, and voltage detection means for detecting the common mode voltages from the power converter and the control voltage source which are superimposed by the voltage superimposition means, and feeding back the detected voltage to the control voltage source, wherein the control voltage source controls to set the voltage detected by the voltage detection means to zero.

According to the third aspect of the present invention, there is provided an active common mode canceler comprising a control voltage source for outputting a common mode voltage to cancel out a common mode voltage generated when a power semiconductor device of a power converter for performing power converter by switching the power semiconductor device is switched, voltage superimposition means for superimposing the common mode voltage output from the control voltage source on the common mode voltage generated by the power converter, and current detection means for detecting a common mode current which flows when the common mode voltages from the power converter and the control voltage source are superimposed by the voltage superimposition means, and feeding back the detected current to the control voltage source, wherein the control voltage source controls to set the current detected by the current detection means to zero.

According to the fourth aspect of the present invention, there is provided an active common mode canceler comprising computation means for computing a common mode voltage, which is generated when a power semiconductor device of a power converter for performing power conversion by switching the power semiconductor device is switched, on the basis of a reference value used to ON/OFF-control the power semiconductor device, a control voltage source which is controlled by the common mode voltage obtained by the computation means to generate a voltage equal in magnitude and opposite in polarity to the common mode voltage, and voltage superimposition means for canceling out the common mode voltage by superimposing the voltage generated by the voltage control source on an output from the power converter.

In the active common mode cancelers according to the first to fourth aspects of the present invention, a common mode voltage equal in magnitude and opposite in polarity to the common mode voltage generated when the power semiconductor device of the power converter is switched is generated, and the common mode voltage applied to the load can be canceled out by superimposing this common mode voltage on an output from the power converter. Therefore, the harmful common mode voltage generated by the power converter can be completely eliminated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 1 is a circuit diagram showing the first embodiment of the present invention in which an active common mode canceler of the present invention is applied to the main circuit of a system for performing vector control on an induction motor by using a voltage-source PWM inverter;

FIG. 2 is an equivalent circuit diagram of the active common mode canceler of the first embodiment;

FIG. 3 is a graph showing the waveform of a common mode current flowing from an inverter to an induction motor when no active common mode canceler is used;

FIG. 4 is a graph showing the waveform of a common mode current flowing from an inverter to an induction motor when an active common mode canceler is used;

FIG. 5 is a circuit diagram showing the second embodiment of the present invention;

FIG. 6 is a circuit diagram showing the third embodiment of the present invention;

FIG. 7 is a circuit diagram showing the fourth embodiment of the present invention; and FIG. 8 is a circuit diagram showing the fifth embodiment of the present invention.

DETAILED DESCRIPTION OF THE INVENTION

The embodiments of the present invention will be described below.

FIG. 1 is a circuit diagram showing the first embodiment of the present invention in which an active common mode canceler of the present invention is applied to the main circuit of a system for performing vector control on an induction motor by using a voltage-source PWM inverter.

Referring to FIG. 1, reference numeral 1 denotes a three-phase AC power supply; 2, a rectifier for converting an AC output from the three-phase AC power supply 1 into a DC output; 3, a smoothing capacitor for smoothing the DC output from the rectifier 2; and 4, a voltage-source PWM inverter (to be simply referred to as an inverter hereinafter) for receiving the DC voltage smoothed by the smoothing capacitor 3 and converting the DC voltage into a three-phase AC voltage by switching a power semiconductor device (IGPT).

The three-phase AC output terminals of the inverter 4 are connected to an induction motor 6 through cables 5. The stator frame (to be simply referred to as a frame hereinafter) of the induction motor 6 is connected to the ground terminal through the ground line.

A common mode canceler 7 is connected to the output terminals of the inverter 4 of this main circuit arrangement. The common mode canceler 7 includes a voltage detection circuit 8 having capacitors 8a ($C_0$) star-connected to the three-phase AC output terminals of the inverter 4 and serving to detect a common mode voltage, a push-pull type emitter follower circuit 9 using complementary transistors $Tr_1$ and $Tr_2$ for amplifying the common mode voltage obtained from the neutral point of the voltage detection circuit 8, and a common mode transformer 11 in which a primary coil L1 receives an output from the emitter follower circuit 9 through capacitors 10 ($C_1$), and secondary coils L2 are connected to the cable 5. In addition, driving power is obtained from the input side of the inverter 4.

A control voltage source used for the common mode canceler is required to have fast-response characteristics that allow the common mode voltage of the inverter, which changes stepwise for every switching operation, to be output with high fidelity, and low-output-impedance characteristics. The emitter follower circuit 9 realizes a control voltage source that meets this requirement.

As the common mode voltage of the voltage-source inverter, the potential at the neutral points of the capacitors star-connected to the output terminals of the inverter. When the capacitance of the voltage detection circuit 8 is large, an excessive large spike-like impulse current flows in the power semiconductor device at the time of switching, and may damage the device.

However, this system uses the capacitors (180 pF×3) having almost the same capacitance as the output capacitance of the power semiconductor device of the inverter. For this reason, almost no problem is posed in terms of the influences of this impulse current on the power semiconductor device. Since the input impedance of the emitter follower circuit 9 is sufficiently high, the common mode voltage of the inverter 4 can be detected with sufficient precision even by using such a small-capacitance capacity. In addition, since the output impedance of the emitter follower circuit 9 is sufficiently low, an exciting current $i_m$ for the common mode transformer 11 is supplied from only the emitter follower circuit 9.

Furthermore, since a high power supply voltage is obtained as driving power for the common mode canceler from the input side of the inverter 4, a transformer having a turn ratio (between the primary and secondary windings) of 1:1 is used as the common mode transformer 11.

The function of the common mode canceler having the above arrangement will be described next with reference to FIG. 2.

FIG. 2 is an equivalent circuit diagram of a common mode circuit using a common mode canceler. Referring to FIG. 2, reference symbol C denotes the stray capacitance between the winding of the motor and the frame; and l and r, the inductance and resistance of the overall interconnection.

When one phase of the inverter is switched, a common mode voltage $v_{inv}$ output from the inverter changes stepwise in units of $E_d/3$. When the common mode voltage $v_{inv}$ is input to the emitter follower circuit 9, the circuit can be expressed by a control voltage source for outputting a voltage $v_c$ equal in magnitude to the common mode voltage. The common mode transformer 11 connected to the output terminal of the emitter follower circuit 9 is expressed by only an exciting inductance $L_m$, with the leakage inductance being neglected.

Every time the inverter 4 is switched, the zero phase-sequence voltage output from the inverter 4, i.e., the common mode, changes stepwise. As a result, a common mode current i(t) flows to the ground line through the stray capacitance between the winding of the motor 6 and the frame.

At this time, if the voltage detection circuit 8 constituted by the star-connected capacitors 8a detects the common mode voltage of the inverter 4, and outputs the voltage $v_c$ equal in magnitude and opposite in polarity to the common mode voltage $v_{inv}$ to the common mode transformer 11 connected in series with the circuit 8, the common mode voltage can be completely canceled out. As a result, no common mode current i(t) flows.

In this manner, the common mode canceler 7 can eliminate both the common mode voltage and the common current at once.

FIG. 3 shows the waveform of a common mode current obtained when no common mode canceler is used.

A common mode current flows through the stray capacitance between the inductance of the interconnection, the winding of the motor, and the frame every time the inverter is switched. This current has a waveform similar to an attenuating oscillation waveform obtained when a step voltage is applied to an LCR series resonance circuit. For this reason, the equivalent circuit diagram of a common mode circuit can be regarded as an LCR series resonance circuit in which the two ends of the exciting inductance $L_m$ in FIG. 2 are short-circuited.

As shown in FIG. 3, every time the inverter is switched, a common mode current having a peak value of 0.44 A and an oscillation frequency of 290 Hz flows. This common mode current is relatively large as compared with the rated current in the system, and hence may cause an operation error in an earth leakage breaker or EMI.

FIG. 4 shows the waveform of a common mode current obtained when the common mode canceler is used. As is apparent from FIG. 4, when the common mode canceler is used, the common mode current can be suppressed almost perfectly. It is apparent that the common mode current can be reduced very effectively by using the common mode canceler.

Another embodiment of the present invention will be described next with reference to FIGS. 5 to 8. The same reference numerals in FIGS. 5 to 8 denote the same parts as in FIG. 1, and a description thereof will be omitted; only different points will be described below.

FIG. 5 is a circuit diagram showing the second embodiment of the present invention. Referring to FIG. 1, the capacitors are star-connected to the cables of the respective phases on the output side of the inverter, and a common mode voltage is extracted from the neutral point to be input to the emitter follower circuit 9. In the second embodiment, however, a common voltage obtained from the neutral point of a voltage detection circuit 8 constituted by capacitors 8a star-connected to cables of the respective phases on the secondary winding output side of a common mode transformer 11 is detected, the detected voltage is amplified by an amplifier 12, and the amplified voltage is input to an emitter follower circuit 9.

With the use of the common mode canceler having the above arrangement, therefore, the common mode voltage obtained by adding the common mode voltage of the control voltage source to the common mode voltage generated by the inverter is detected, and the detected voltage is properly amplified by the amplifier 12 to be fed back to the control voltage source. With this operation, the common mode voltage applied to the load can be completely canceled out.

FIG. 6 is a circuit diagram showing the third embodiment of the present invention. Referring to FIG. 5, the capacitors are star-connected to the cables of the respective phase on the secondary winding output side of the common mode transformer 11, and the common mode voltage obtained from the neutral point is detected. In the third embodiment, however, a current flowing in the cables on the secondary winding output side of a common mode transformer 11 is detected by a current transformer 13, and the detected current is amplified by an amplifier 14 to be input to an emitter follower circuit 9.

With the use of the common mode canceler having the above arrangement, therefore, the common mode voltage of the control voltage source is superimposed on the common mode voltage generated by an inverter 4, and the common mode current detected by the current transformer 13 is amplified by the amplifier 14 to be input to the emitter follower circuit 9. With this operation, the control voltage source performs feedback control to set the common mode current to zero.

FIG. 7 is a circuit diagram showing the fourth embodiment of the present invention. Referring to FIG. 1, the driving power for the common mode canceler is obtained from the input side of the inverter 4. In the fourth embodiment, however, another DC power supply 15 with a low power supply voltage is used as the driving power supply for the common mode canceler. In this case, the common mode voltage obtained from the neutral point of a voltage detection circuit 8 constituted by star-connected capacitors 8a is input to an emitter follower circuit 9 through an attenuator 17.

When a power supply voltage is to be obtained from the input side of the inverter, as shown in FIG. 1, since the voltage is high, the turn ratio of the primary and secondary windings of the common mode transfer is set to 1:1. When another power supply 15 with a low power supply voltage is used as in the fourth embodiment, the same effects as those of the first embodiment can be obtained by changing the turn ratio of the primary and secondary windings of the common mode transfer. In this case, as transistors Tr1 and Tr2 of the emitter follower circuit 9, transistors with low breakdown voltages can be used.

FIG. 8 is a circuit diagram showing the fifth embodiment of the present invention. Referring to FIG. 1, as the common mode voltage generated by the inverter, the common mode voltage obtained from the neutral point of the star-connected capacitors is detected. In the fifth embodiment, however, a control circuit 16 for an inverter 4 has the computation function of computing the common mode voltage generated by the inverter 4 on the basis of a reference value for ON/OFF-controlling the power semiconductor device, and the common mode voltage obtained by this computation function is input to an emitter follower circuit 9 of the common mode canceler.

With the use of the common mode canceler having the above arrangement, therefore, no capacitor need be arranged on the output side of the voltage-fed inverter, and hence no spike-like current flows in the switching element.

In each embodiment described above, the active common mode canceler 7 of the present invention is applied to the system for operating the induction motor by using the voltage-source PWM inverter. However, this canceler can be applied to other power converter, such as a DC—DC converter, in which a common mode voltage is generated when the power semiconductor device is switched.

Apparently, the present invention is not limited to the above embodiment described with the accompanying drawings, and various changes and modifications of the embodiments can be made without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An active common mode canceler comprising:
    voltage detection means for detecting a common mode voltage generated when a power semiconductor device of a power converter for performing power conversion by switching said power semiconductor device is switched;
    a control voltage source which is controlled by the common mode voltage detected by said voltage detection means to generate a voltage equal in magnitude and opposite in polarity to the common mode voltage; and
    voltage superimposition means for canceling out the common mode voltage by superimposing the voltage generated by said control voltage source, on a common mode voltage output from said power converter.

2. A canceler according to claim 1, wherein said voltage detection means uses a capacitor having a capacitance smaller than an output capacitance of said power semiconductor device of said power converter.

3. A canceler according to claim 1, wherein said voltage superimposition means comprises a common mode transformer having multiple windings.

4. A canceler according to claim 1, wherein said control voltage source comprises a push-pull type emitter follower circuit using a transistor for amplifying a common mode voltage.

5. A canceler according to claim 1, wherein said control voltage source obtains driving power from an input side of said power converter.

6. A canceler according to claim 1, wherein said control voltage source uses a DC power supply as a driving power supply.

7. An active common mode canceler comprising:
    a voltage detection circuit including a plurality of capacitors connected to output terminals of a power converter for performing power conversion by switching a power semiconductor device and adapted to detect a common mode voltage generated when said power semiconductor device is switched; a push-pull type emitter follower circuit which is controlled by the common mode voltage detected by said voltage detection voltage to output a voltage equal in magnitude and opposite in polarity to the common mode voltage; and a common mode transformer having multiple windings and adapted to cancel out the common mode voltage by superimposing a voltage output from said emitter follower circuit on an output from said power converter.

8. An active common mode canceler comprising:
    a control voltage source for outputting a common mode voltage to cancel out a common mode voltage generated when a power semiconductor device of a power converter for performing power conversion by switching said power semiconductor device is switched; voltage superimposition means for superimposing the common mode voltage output from said control voltage source on the common mode voltage generated by said power converter; and
    voltage detection means for detecting the common mode voltages from said power converter and said control voltage source which are superimposed by said voltage superimposition means, and feeding back the detected voltage to said control voltage source, wherein said control voltage source controls to set the voltage detected by said voltage detection means to zero.

9. A canceler according to claim 8, wherein said voltage detection means uses a capacitor having a capacitance smaller than an output capacitance of said power semiconductor device of said power converter.

10. A canceler according to claim 8, wherein said voltage superimposition means comprises a common mode transformer having multiple windings.

11. A canceler according to claim 8, wherein said control voltage source comprises a push-pull type emitter follower circuit using a transistor for amplifying a common mode voltage.

12. An active common mode canceler comprising:
    a push-pull type emitter follower circuit using a transistor and adapted to output a common mode voltage to cancel out a common mode voltage generated when a power semiconductor device of a power converter for performing power conversion by switching said power semiconductor device is switched; a common mode which has multiple windings and is arranged on an output side of said power converter to cancel out the common mode voltage by superimposing the common mode voltage output from said emitter follower circuit on the common mode voltage generated by said power converter; and a voltage detection circuit having a plurality of capacitors and adapted to detect the common mode voltages from said power converter and said emitter follower circuit which are superimposed by said common mode transformer, and to control to set the detected voltage to zero by feeding back the detected voltage to said emitter follower circuit.

13. An active common mode canceler comprising:
    a control voltage source for outputting a common mode voltage to cancel out a common mode voltage generated when a power semiconductor device of a power converter for performing power conversion by switching said power semiconductor device is switched; voltage superimposition means for superimposing the common mode voltage output from said control voltage source on the common mode voltage generated by said power converter;
    and current detection means for detecting a common mode current which flows when the common mode voltages from said power converter and said control voltage source are superimposed by said voltage superimposition means, and feeding back the detected current to said control voltage source, wherein said control voltage source controls to set the current detected by said current detection means to zero.

14. A canceler according to claim 13, wherein said voltage superimposition means comprises a common mode transformer having multiple windings.

15. A canceler according to claim 13, wherein said control voltage source comprises a push-pull type emitter follower circuit using a transistor for amplifying a common mode voltage.

16. An active common mode canceler comprising:

computation means for computing a common mode voltage, which is generated when a power semiconductor device of a power converter for performing power conversion by switching said power semiconductor device is switched, on the basis of a reference value used to ON/OFF-control said power semiconductor device; a control voltage source which is controlled by the common mode voltage obtained by said computation means to generate a voltage equal in magnitude and opposite in polarity to the common mode voltage; and voltage superimposition means for canceling out the common mode voltage by superimposing the voltage generated by said voltage control source, on a common mode voltage output from said power converter.

17. A canceler according to claim 16, wherein said voltage superimposition means comprises a common mode transformer having multiple windings.

18. A canceler according to claim 16, wherein said control voltage source comprises a push-pull type emitter follower circuit using a transistor for amplifying a common mode voltage.

* * * * *